(12) United States Patent
Cortés et al.

(10) Patent No.: US 8,461,702 B2
(45) Date of Patent: Jun. 11, 2013

(54) SYSTEM FOR THE TRANSPORT OF AN ORE PULP IN A LINE SYSTEM LOCATED ALONG A GRADIENT, AND COMPONENTS OF SUCH A SYSTEM

(75) Inventors: Julio Cortés, Santiago de Chile (CL); Michael Riebensahm, Santiago (CL); Christian Schiller, Berlin (DE); Otto Schäfer, Erlangen (DE); Kurt Tischler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 401 days.

(21) Appl. No.: 12/863,638

(22) PCT Filed: Jan. 8, 2009

(86) PCT No.: PCT/EP2009/050183
§ 371 (c)(1),
(2), (4) Date: Sep. 15, 2010

(87) PCT Pub. No.: WO2009/092633
PCT Pub. Date: Jul. 30, 2009

(65) Prior Publication Data
US 2011/0012370 A1 Jan. 20, 2011

(30) Foreign Application Priority Data

Jan. 23, 2008 (DE) .......................... 10 2008 005 689
Feb. 18, 2008 (DE) .......................... 10 2008 009 669

(51) Int. Cl.
*F02B 63/04* (2006.01)
*F03G 7/08* (2006.01)
*H02K 7/18* (2006.01)
*F01D 1/18* (2006.01)
*F03B 1/00* (2006.01)
*F03B 3/00* (2006.01)

(52) U.S. Cl.
USPC ............................................. 290/1 R; 415/80

(58) Field of Classification Search
USPC ............................................. 415/80; 290/1 R
See application file for complete search history.

(56) References Cited

U.S. PATENT DOCUMENTS 3,153 A * 7/1843 Whitelaw et al. ............... 415/80
3,943 A * 3/1845 Black .............................. 60/227

(Continued)

FOREIGN PATENT DOCUMENTS

AT 4265 4/2001
CA 2412583 6/2004

(Continued)

OTHER PUBLICATIONS

International PCT Search Report, PCT/EP2009/050183, 15 pages, Mailed Apr. 15, 2010.

(Continued)

Primary Examiner — Pedro J Cuevas
(74) Attorney, Agent, or Firm — King & Spalding L.L.P.

(57) ABSTRACT

A system for transporting an ore pulp (S) in a line system (2) located along a gradient, wherein the ore pulp (S) flows in the line system by the effect of gravity, has at least one generator station (8) located in the line system (2), the station comprising a flow machine (11) driven by the ore pulp (S) and a generator (14) coupled to the flow machine (11) for producing electrical energy as components of the transport system.

12 Claims, 2 Drawing Sheets

U.S. PATENT DOCUMENTS

| | | | | | |
|---|---|---|---|---|---|
| 5,039 | A * | 3/1847 | Galvani | | 60/681 |
| 24,740 | A * | 7/1859 | Hughes | | 415/80 |
| 31,217 | A * | 1/1861 | Armstrong | | 415/24 |
| 36,164 | A * | 8/1862 | Monson | | 415/80 |
| 37,841 | A * | 3/1863 | Megay | | 415/80 |
| 63,148 | A * | 3/1867 | Ely | | 60/227 |
| 75,011 | A * | 3/1868 | Hainsworth | | 415/80 |
| 103,162 | A * | 5/1870 | Duvall | | 415/80 |
| 110,912 | A * | 1/1871 | Gibson | | 415/80 |
| 211,572 | A * | 1/1879 | Hinden | | 73/861.86 |
| 214,159 | A * | 4/1879 | Langevin | | 241/259 |
| 499,121 | A * | 6/1893 | Kales | | 415/91 |
| 523,734 | A * | 7/1894 | Shaw | | 60/39.11 |
| 634,969 | A * | 10/1899 | Wahle | | 415/80 |
| 700,224 | A * | 5/1902 | McRae | | 415/174.1 |
| 709,242 | A * | 9/1902 | Prescott et al. | | 415/80 |
| 715,152 | A * | 12/1902 | Roeske | | 415/80 |
| 768,884 | A * | 8/1904 | O'Brien | | 415/80 |
| 890,392 | A * | 6/1908 | Adams | | 415/80 |
| 935,046 | A * | 9/1909 | McLaren | | 415/80 |
| 982,035 | A * | 1/1911 | Clapp | | 415/80 |
| 999,776 | A * | 8/1911 | Gill | | 415/82 |
| 1,049,213 | A * | 12/1912 | Dresser | | 60/39.41 |
| 1,050,410 | A * | 1/1913 | Wainwright | | 60/698 |
| 1,287,049 | A * | 12/1918 | Kramer | | 60/39.34 |
| 1,329,626 | A * | 2/1920 | Oman | | 415/80 |
| 2,060,414 | A * | 11/1936 | Fladeland | | 415/69 |
| 2,569,997 | A * | 10/1951 | Kollsman | | 60/698 |
| 2,690,809 | A * | 10/1954 | Kerry | | 416/22 |
| 3,304,051 | A * | 2/1967 | Thomas | | 415/80 |
| 3,383,805 | A * | 5/1968 | Powell | | 451/294 |
| 3,813,043 | A * | 5/1974 | Mordehai | | 239/204 |
| 3,879,152 | A * | 4/1975 | Eskeli | | 415/80 |
| 3,984,698 | A * | 10/1976 | Brewer | | 290/54 |
| 3,999,711 | A * | 12/1976 | Katzman | | 239/230 |
| 4,027,483 | A * | 6/1977 | Wahl, III | | 60/641.2 |
| 4,059,772 | A * | 11/1977 | Wilkerson | | 307/46 |
| 4,132,901 | A | 1/1979 | Crausbay | | 290/53 |
| 4,272,685 | A | 6/1981 | Toyama | | 290/52 |
| 4,274,814 | A * | 6/1981 | Rylewski | | 418/15 |
| 4,298,311 | A * | 11/1981 | Ritzi | | 415/80 |
| 4,302,683 | A * | 11/1981 | Burton | | 290/4 R |
| 4,332,520 | A * | 6/1982 | House | | 415/63 |
| 4,336,693 | A * | 6/1982 | Hays et al. | | 62/116 |
| 4,363,341 | A * | 12/1982 | Powell | | 141/78 |
| 4,391,102 | A * | 7/1983 | Studhalter et al. | | 60/649 |
| 4,430,042 | A * | 2/1984 | House | | 415/1 |
| 4,438,638 | A * | 3/1984 | Hays et al. | | 62/500 |
| 4,452,566 | A * | 6/1984 | Kardas | | 415/81 |
| 4,651,765 | A * | 3/1987 | Beth | | 137/99 |
| 4,741,154 | A * | 5/1988 | Eidelman | | 60/39.34 |
| 4,893,986 | A | 1/1990 | Catterfeld et al. | | 415/100 |
| D307,044 | S * | 4/1990 | Johnston et al. | | D23/220 |
| 5,236,349 | A * | 8/1993 | Fabris | | 415/80 |
| 5,263,814 | A * | 11/1993 | Jang | | 415/63 |
| 5,307,993 | A * | 5/1994 | Simonetti et al. | | 239/247 |
| 5,408,824 | A * | 4/1995 | Schlote | | 60/39.35 |
| 5,525,034 | A * | 6/1996 | Hays | | 415/80 |
| 5,560,196 | A * | 10/1996 | Schlote | | 60/39.35 |
| 5,738,249 | A * | 4/1998 | Kikuchi et al. | | 222/148 |
| 5,905,312 | A * | 5/1999 | Liou | | 290/54 |
| 6,029,688 | A * | 2/2000 | Kaufman | | 137/99 |
| 6,668,539 | B2 * | 12/2003 | Schlote | | 60/39.35 |
| 6,783,320 | B2 * | 8/2004 | Johnson | | 415/80 |
| 6,929,444 | B1 * | 8/2005 | Bomski | | 415/80 |
| 6,996,971 | B2 * | 2/2006 | Schlote | | 60/39.35 |
| 7,222,487 | B1 * | 5/2007 | Hinkley | | 60/639 |
| 7,722,313 | B1 * | 5/2010 | Dilorio | | 415/80 |
| 8,342,364 | B2 * | 1/2013 | Bertucci et al. | | 222/57 |
| 2005/0147493 | A1 * | 7/2005 | Vorobiev et al. | | 415/206 |
| 2006/0230742 | A1 * | 10/2006 | Witteveen | | 60/39.35 |
| 2008/0272601 | A1 * | 11/2008 | Newman | | 290/54 |
| 2013/0008522 | A1 * | 1/2013 | Bertucci et al. | | 137/87.01 |

FOREIGN PATENT DOCUMENTS

| | | |
|---|---|---|
| DE | 130466 | 4/1978 |
| WO | 2006/028377 A1 | 3/2006 |

OTHER PUBLICATIONS

Walker, C.I; "Slurry Turbine Energy Recovery Systems", in Liu, H. and Round, GF: Freight Pipelines, Proceedings of the 6th International Symposium on Freight Pipelines, Hemisphere Publishing Corporation, XP002576115, pp. 51-56, 1990.

* cited by examiner

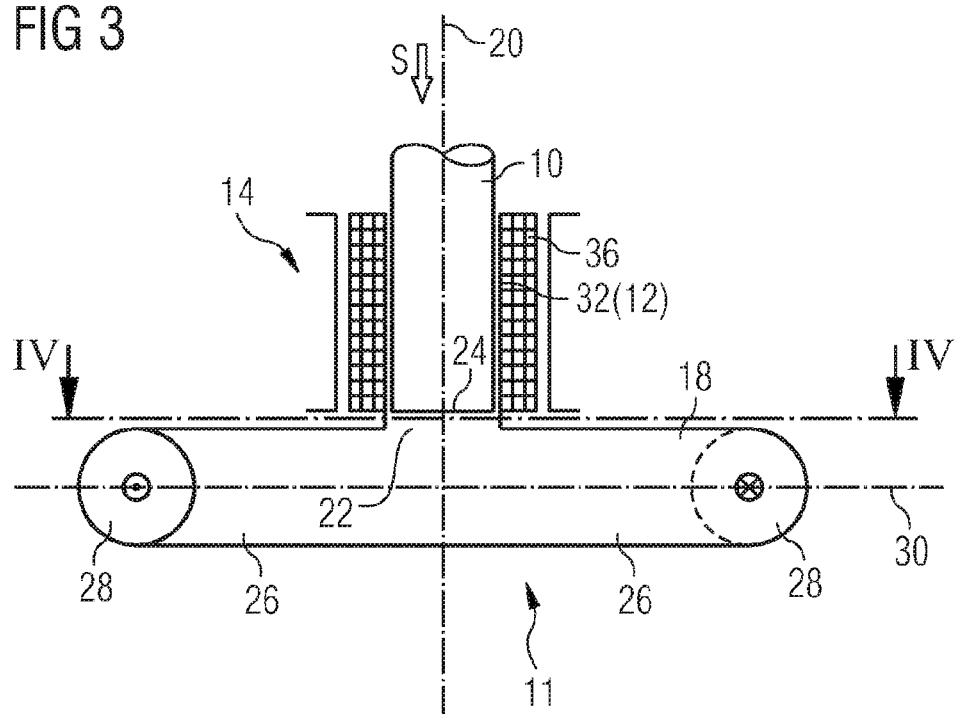
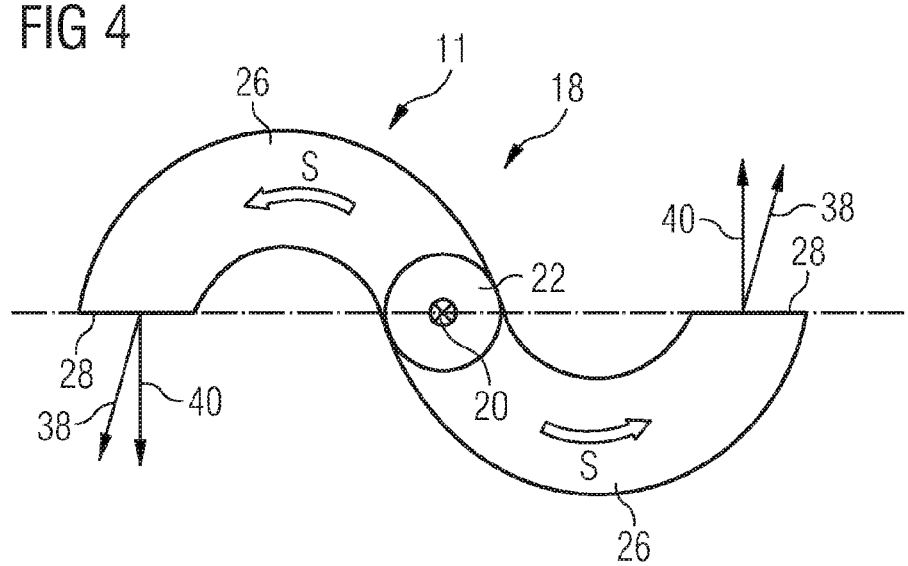

SYSTEM FOR THE TRANSPORT OF AN ORE PULP IN A LINE SYSTEM LOCATED ALONG A GRADIENT, AND COMPONENTS OF SUCH A SYSTEM

CROSS-REFERENCE TO RELATED APPLICATIONS

This application is a U.S. National Stage Application of International Application No. PCT/EP2009/050183 filed Jan. 8, 2009, which designates the United States of America, and claims priority to DE Application No. 10 2008 005 689.8 filed Jan. 23, 2008 and DE Application No. 10 2008 009 669.5 filed Feb. 18, 2008. The contents of which are hereby incorporated by reference in their entirety.

TECHNICAL FIELD

The invention relates to a system for the transport of an ore pulp in a line system located along a gradient. In addition, the invention relates to components of such a system.

BACKGROUND

In many mining countries such as Chile and Peru, the systems for extracting ore lie at high altitudes of 2000 m to 5000 m. In these systems, the ore, after initial processing, is transported further as aqueous sludge in line systems to plants in which the suspended ore, also called ore pulp, is subsequently processed. During this initial processing, the ore is concentrated as a rule. Thus, for example, copper ore in natural deposits has a metal content of 0.5% to 3%. For the transport to the plants for the subsequent processing, for example smelting plants, the copper ore is concentrated to values of 30% to 50% during the initial processing in concentrator plants which are located in the vicinity of the mine. The plants for the subsequent processing are as a rule not located in the vicinity of the mine but rather at sea level at home or abroad, and therefore the concentrate in this case has to be shipped and exported. What are known as "slurry pipelines" are being increasingly used in order to transport the concentrate to the smelting plants or to the harbor, in which slurry pipelines the concentrate, the ore pulp (slurry), which is enriched with water for the transport, flows from the mine located at a high altitude to the coast. More than six slurry pipelines of this kind are in operation in Chile, the length of which is on average 170 km and which overcome an average difference in altitude of 3000 m with an average transport capacity of 2.5 million tons per year.

SUMMARY

According to various embodiments, a system for the transport of an ore pulp in a line system located along a gradient can be specified, wherein the system works with high economic efficiency. In addition, components can be specified suitable for the operation of such a system.

According to an embodiment, a system for the transport of an ore pulp in a line system which is located along a gradient and in which the ore pulp flows under the effect of the gravitational force, may comprise at least one generator station arranged in the line system, said generator station having a continuous-flow machine driven by the ore pulp and a generator coupled to the continuous-flow machine for generating electrical energy.

According to a further embodiment, the continuous-flow machine may comprise a rotating shaft which is driven by the flowing ore pulp and is connected to the generator in a gearless manner. According to a further embodiment, the system may comprise a plurality of generator stations arranged at a distance from one another at different altitudes.

According to another embodiment, a continuous-flow machine for a system as described above may have a housing mounted such as to be rotatable about an axis and having an inlet for the ore pulp, said inlet being connected to an outlet of a pipeline, carrying the ore pulp, of the line system and opening into at least one curved pipe part, from which the ore pulp flows out at a distance from the axis and has, when flowing out, a flow direction which, in a plane oriented perpendicularly to the axis, has a velocity component oriented perpendicularly to this axis in such a way that a torque is exerted on the housing about this axis.

According to a further embodiment of the continuous-flow machine, the inlet can be formed by a pipe into which the outlet of the pipeline is inserted. According to a further embodiment of the continuous-flow machine, the pipe may form the rotating shaft.

According to yet another embodiment, a generator system may comprise a continuous-flow machine as described above and a generator driven by said continuous-flow machine, wherein the rotating shaft of the continuous-flow machine is at the same time the rotor of the generator.

BRIEF DESCRIPTION OF THE DRAWINGS

For further explanation, reference is made to the exemplary embodiment reproduced in the drawings, in which:

FIGS. 3 and 4 show a continuous-flow machine used in a generator station, in a side view and a plan view, respectively.

DETAILED DESCRIPTION

According to various embodiments, the system for the transport of an ore pulp in a line system which is located along a gradient and in which the ore pulp flows under the effect of the gravitational force is provided with at least one generator station arranged in the line system, said generator station has a continuous-flow machine driven by the ore pulp and a generator coupled to said continuous-flow machine for generating electrical energy.

According to various embodiments, the high potential energy of the ore pulp can in principle also be used for generating electrical energy, since it is possible to also drive a continuous-flow machine with a viscous aqueous sludge. This high potential energy has hitherto been wasted in pressure reduction devices arranged in the line system.

If the continuous-flow machine comprises a shaft which is driven by the flowing ore pulp and is connected to a generator in a gearless manner, it is possible to generate electrical energy with especially high efficiency.

If the line system overcomes a very large difference in altitude over a considerable length, the potential energy of the ore pulp can be utilized especially effectively if a plurality of generator stations located at a distance from one another at different altitudes are arranged in the line system.

According to various embodiments, a continuous-flow machine suitable for driving the generator of the system can be specified as a component of the system.

Accordingly, the continuous-flow machine has a housing mounted such as to be rotatable about an axis and having an inlet for the ore pulp, said inlet being connected to an outlet of a pipeline, carrying the ore pulp, of the line system and opening into at least one curved pipe part, from which the ore pulp flows out at a distance from the axis.

In this case, the ore pulp has, when flowing out, a flow direction which, in a plane oriented perpendicular to the axis, has a velocity component oriented perpendicular to this axis in such a way that a torque is exerted on the housing about this axis. Such a continuous-flow machine acts like a centrifugal radial machine and converts the kinetic energy of the flowing ore pulp into a rotary motion in an especially effective manner.

If the inlet is formed by a pipe into which the outlet-side end of the pipeline is inserted, and the pipe at the same time in particular forms the rotating shaft, an especially compact construction of the continuous-flow machine is made possible.

An especially economical type of construction is achieved if a generator system is used in which the continuous-flow machine together with the generator driven by it form a structural unit by the rotating shaft of the continuous-flow machine being at the same time the rotor of the generator.

Figure 1:
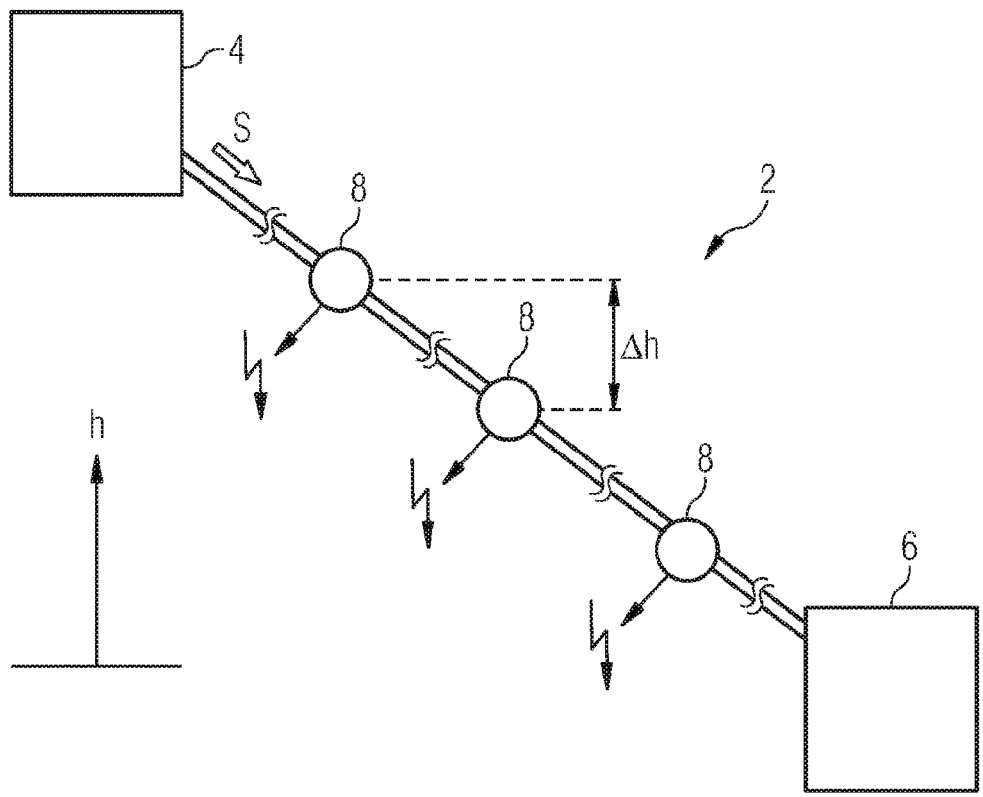
FIG. 1 shows a system according to various embodiments in a schematic diagrammatic illustration.

According to FIG. 1, a system for the transport of an ore pulp S comprises a line system 2 which is located along a gradient and in which the ore pulp S is transported from a concentrator plant 4 arranged in the region of a mine to a subsequent processing plant 6 situated at a lower level. Arranged in the line system 2 at different altitudes h are a plurality of generator stations 8 having a continuous-flow machine which is driven by the ore pulp and with which the potential energy of the ore pulp S flowing in the line system 2 is converted into electrical energy. The typical head Δh upstream of such a generator station 8 is about 500 to 1000 m.

Figure 2:
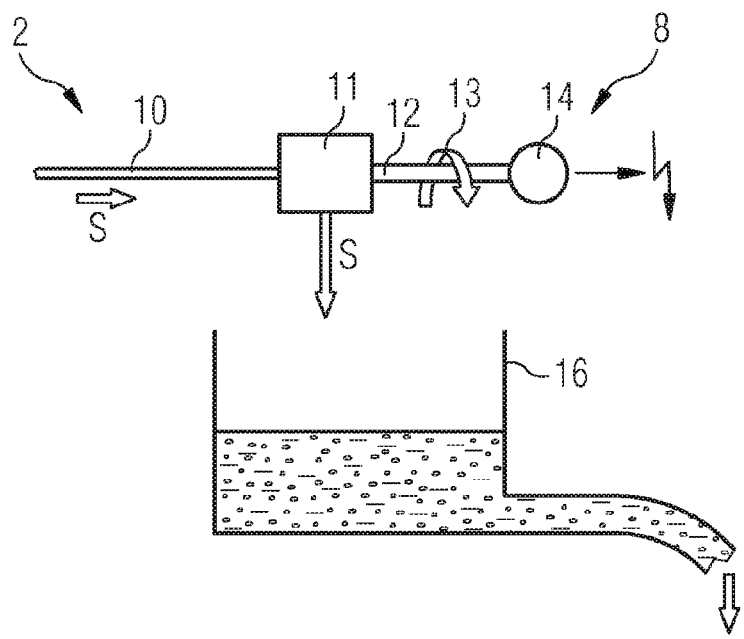
FIG. 2 shows a generator station, likewise in a schematic diagrammatic illustration.

The basic construction of such a generator station 8 is shown in FIG. 2. The ore pulp S flowing in a pipeline 10 of the line system 2 flows through a continuous-flow machine 11 and sets a shaft 12 of the continuous-flow machine 11 in rotary motion, as indicated by the arrow 13. The shaft 12 drives a generator 14, with which the kinetic energy of the ore pulp is converted into electrical energy. The ore pulp S flowing out of the continuous-flow machine 12 flows into a collecting basin 16, from which it flows further on to the next generator station 8 or to the subsequent processing plant 6.

FIG. 3 shows the basic construction of a continuous-flow machine 12 which is especially suitable for the generation of electricity using a flowing ore pulp S. The continuous-flow machine 12 has a housing 18 which is mounted such as to be rotatable about an axis 20. The housing 18 is provided with an inlet 22 for the ore pulp S, and this inlet 22 is connected to an outlet 24 of the pipeline 10 carrying the ore pulp. The inlet 22 opens into two curved pipe parts 26, from which the ore pulp S flows out, at a distance from the axis 20, into the collecting basin 16 (FIG. 2). The outflow is effected from end openings 28 of the pipe parts 26 in a direction which, in a plane 30 oriented perpendicularly to the axis 20 and perpendicularly to the drawing plane, has a velocity component oriented perpendicularly to this axis 20 in such a way that a torque is exerted on the housing 18 about this axis 20. The openings 28 are arranged with their cross-sectional areas in a common plane, such that the ore pulp S flowing out of them exerts no resultant overall force on the housing 18. Instead of the two curved pipe parts 26 shown in the figure, a larger number of curved pipe parts 26 can also be provided.

The inlet 22 is formed by a pipe 32 into which the outlet-side end of the pipeline 10 is inserted. This pipe 32 at the same time forms the rotating shaft 12 of the continuous-flow machine 11. The pipe 32 (the shaft 12) is provided with a winding 36 on its outer circumference and is at the same time the rotor of the generator 14 (only illustrated schematically), and so the continuous-flow machine 11 and the generator 14 driven by it form a structural unit.

The flow conditions within the continuous-flow machine are illustrated in the plan view according to FIG. 4. The ore pulp S flowing into the housing 18 of the continuous-flow machine vertically to the drawing plane is deflected there by 90° and undergoes a change in the direction of movement in the curved pipe parts 26, the result of which change is that the ore pulp, when flowing out of the openings 28, has a flow direction 38 with a flow component 40 which is oriented perpendicularly to the axis 20 and lies in a plane (the drawing plane) lying perpendicularly to this axis 20, such that a torque is exerted on the housing 18 about this axis 20. The reaction forces produced during the outflow at the two outflow openings 28 are opposite and equal, and therefore the total force transmitted to the housing 18 disappears.

What is claimed is:

1. A system for the transport of an ore pulp in a line system which is located along a gradient and in which the ore pulp flows under the effect of the gravitational force, the system comprising:

a plurality of generator stations arranged at a distance from one another at different altitudes along the gradient of the line system;

the plurality of generator stations each including a continuous-flow machine driven by the ore pulp and a generator coupled to the associated continuous-flow machine for generating electrical energy;

wherein each continuous-flow machine includes a housing rotatably mounted about an axis and having an inlet for the ore pulp;

the inlet being connected to an outlet of a pipeline carrying the ore pulp and opening into at least two curved pipe parts;

the outlet of the pipeline providing that the ore pulp flows out at a distance from the axis and has, when flowing out, a flow direction which, in a plane oriented perpendicularly to the axis, has a velocity component oriented perpendicularly to this axis in such a way that a torque is exerted on the housing about this axis; and wherein the continuous-flow machine comprises a rotating shaft which is driven by the flowing ore pulp and is connected to the generator in a gearless manner.

2. The system according to claim 1, wherein there are two curved pipe parts, and the ore pulp flows out of the two curved pipe parts via two openings, wherein the two curved pipe parts are arranged in such a way that the reaction forces produced during the outflow of the ore pulp at the openings are opposite and equal.

3. The system according to claim 1, wherein a head of the ore pulp upstream of a generator station is within the range of 500 to 1000 m.

4. The system according to claim 1, wherein the inlet of the continuous-flow machine is formed by a pipe into which the outlet of the pipeline is inserted.

5. The system according to claim 4, wherein the pipe forms the rotating shaft.

6. The system according to claim 1, wherein the ore pulp discharging from the continuous-flow machine flows into a collecting basin, from which it flows further on to a subsequent processing plant or to the next generator station.

7. A method for transporting of an ore pulp in a line system which is located along a gradient and in which the ore pulp flows under the effect of the gravitational force, the method comprising:

arranging a plurality of generator stations at different altitudes along the gradient of the line system;

the plurality of generator stations each including a continuous-flow machine driven by the ore pulp and a generator coupled to the continuous-flow machine for generating electrical energy;

wherein each continuous-flow machine has a housing mounted such as to be rotatable about an axis and having an inlet for the ore pulp;

connecting the inlet to an outlet of a pipeline carrying the ore pulp;

wherein the inlet opens into at least two curved pipe parts, from which the ore pulp flows out at a distance from the axis and has, when flowing out, a flow direction which, in a plane oriented perpendicularly to the axis, has a velocity component oriented perpendicularly to this axis in such a way that a torque is exerted on the housing about this axis; and driving a rotating shaft of the continuous-flow machine by the flowing ore pulp wherein the rotating shaft is connected to the generator in a gearless manner.

8. The method according to claim 7, wherein there are two curved pipe parts, and the ore pulp flows out of the two curved pipe parts via two openings, and the method comprising: arranging the two curved pipe parts in such a way that the reaction forces produced during the outflow of the ore pulp at the openings are opposite and equal.

9. The method according to claim 7, wherein a head of the ore pulp upstream of a generator station is within the range of 500 to 1000 m.

10. The method according to claim 7, wherein the inlet of the continuous-flow machine is formed by a pipe into which the outlet of the pipeline is inserted.

11. The method according to claim 10, wherein the pipe forms the rotating shaft.

12. The method according to claim 7, wherein the ore pulp discharging from the continuous-flow machine flows into a collecting basin, from which it flows further on to a subsequent processing plant or to the next generator station.

\* \* \* \* \*